United States Patent

[11] 3,588,859

| [72] | Inventor | Frank Petree |
| --- | --- | --- |
| | | 387 Westmoreland Drive, Idaho Falls, Idaho 83401 |
| [21] | Appl. No. | 817,652 |
| [22] | Filed | Apr. 21, 1969 |
| [45] | Patented | June 28, 1971 |

[54] LEVEL DETECTOR
10 Claims, 7 Drawing Figs.

[52] U.S. Cl. ................................................ 340/244,
128/214, 137/392, 317/246, 340/200
[51] Int. Cl. .................................................. G08b 21/00
[50] Field of Search .......................................... 340/244
(A-D), 237, 200; 128/214, 2.05 (D); 73/304, 308,
309; 137/392, 386; 317/246

[56] References Cited
UNITED STATES PATENTS

| 3,105,490 | 10/1963 | Schoenfeld .................. | 340/244 |
| --- | --- | --- | --- |
| 3,291,149 | 12/1966 | Atkins et al. .................. | 340/244-C |
| 3,397,715 | 8/1968 | Fathaner ...................... | 340/240-C |
| 3,500,366 | 3/1970 | Chesney et al. ............... | 340/258-C |

Primary Examiner—Donald J. Yusko
Assistant Examiner—Walter Benson
Attorney—Wooster, Davis and Cifelli ABSTRACT: There is disclosed a device for attachment to the outside of an intravenous bag or bottle for indicating when the bag or bottle has become nearly empty and requires replacement. The device includes a capacitance bridge made up of distributed capacitances, two of the capacitances in the bridge being formed with the fluid in the bottle. When the fluid reaches a preselected level, the output from the bridge activates the nurses' call system or other alarm.

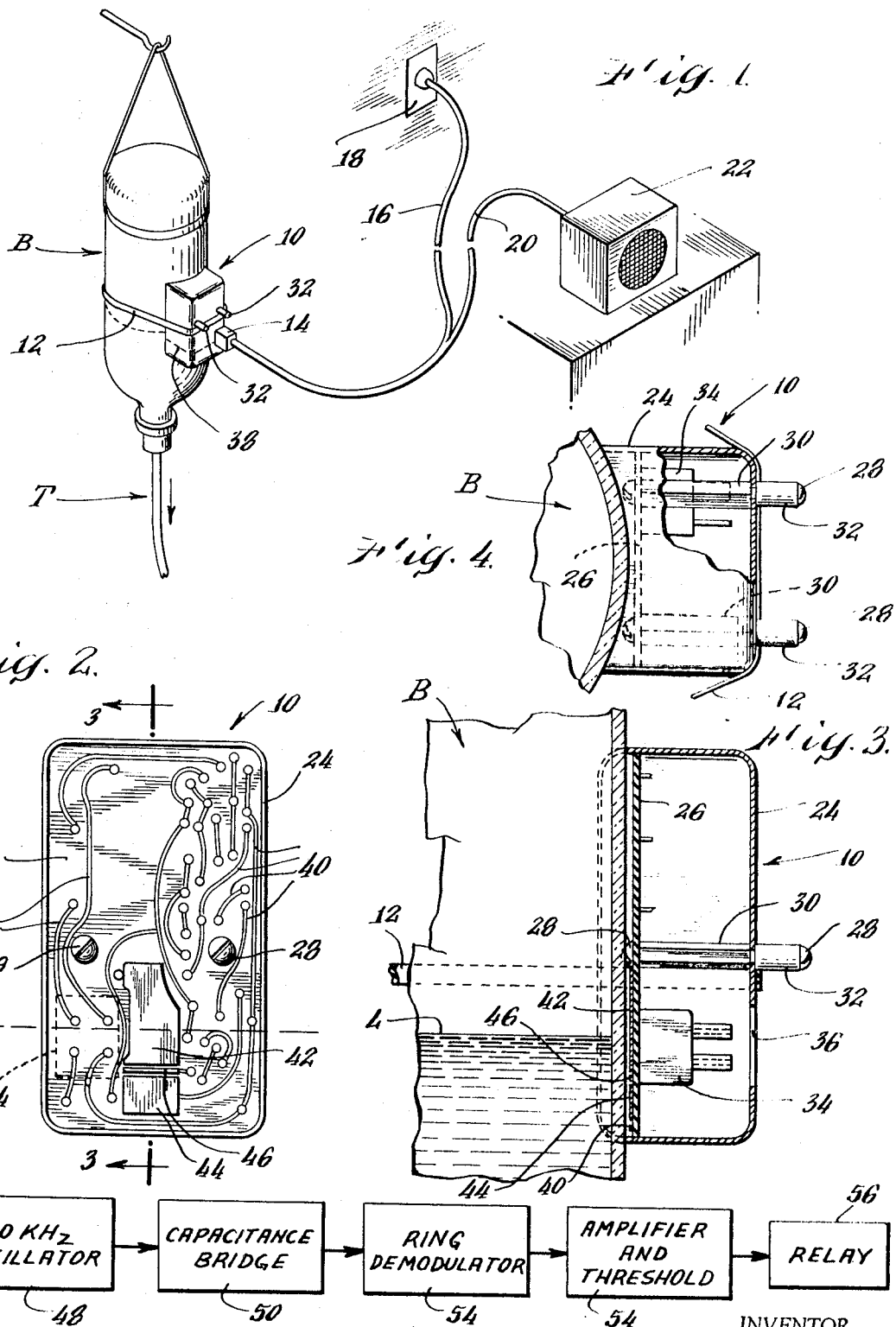

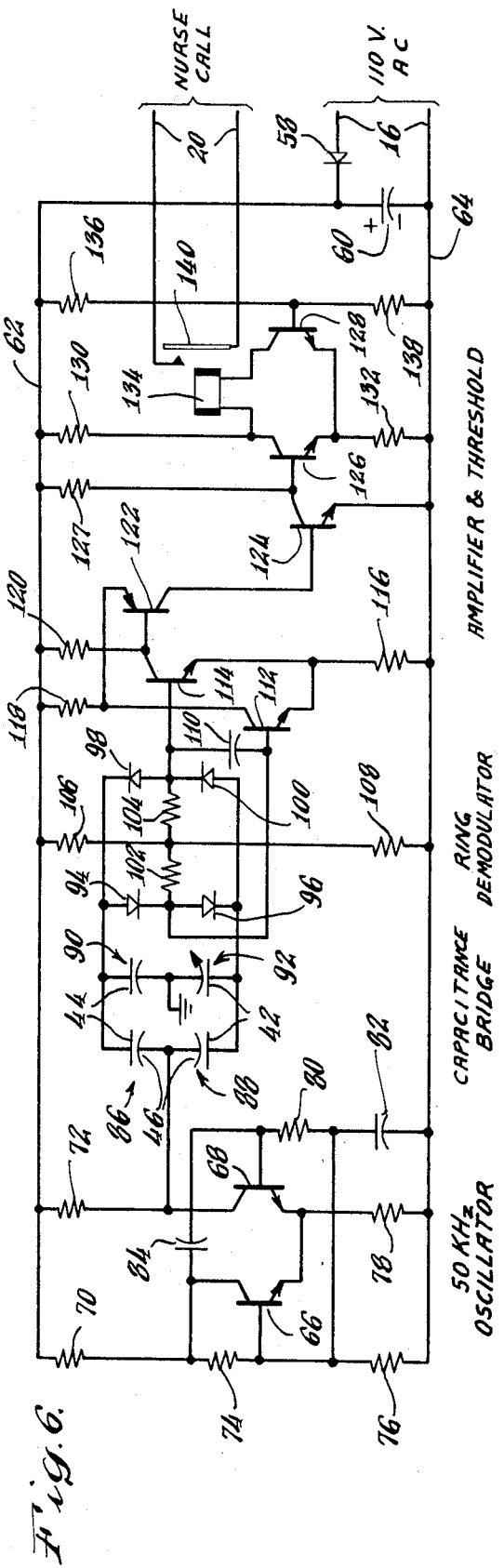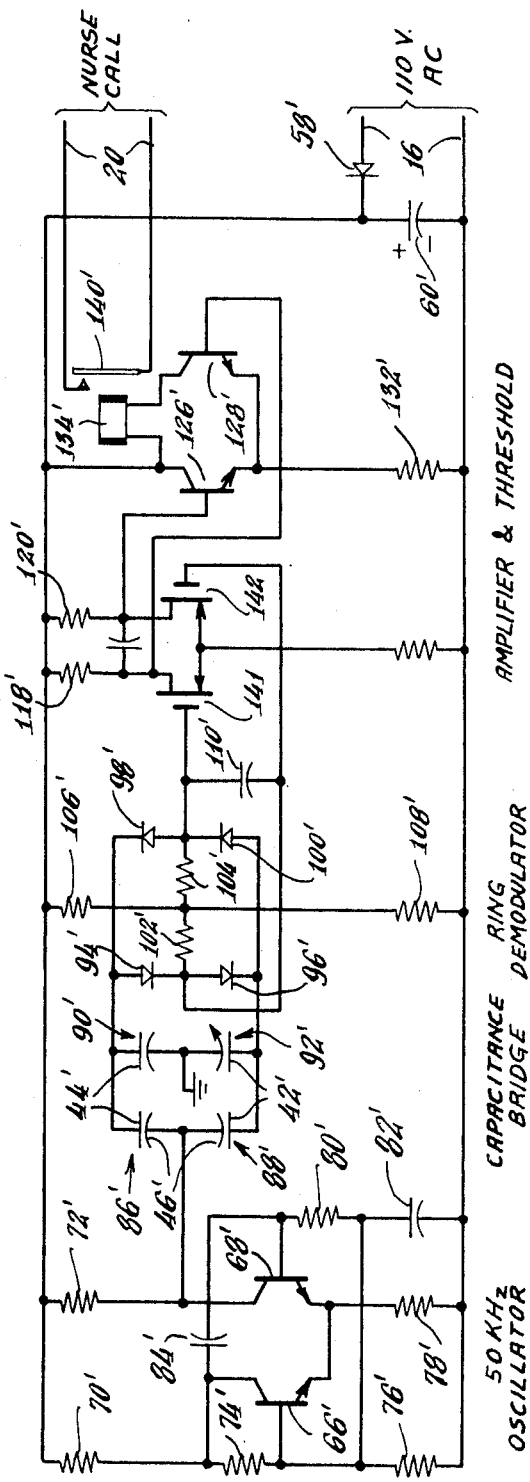

LEVEL DETECTOR

BACKGROUND OF THE INVENTION

The venous infusion of fluids is such a useful procedure, and the efficacy of such infusions so pronounced, that it has become a common and routine procedure in hospitals. The fluids which are administered include, among others, plasma, blood, packed cells, glucose, and saline solution. Most fluids so administered are electrically conductive. In many cases it is, of course, of great importance that the fluid bottle or bag be changed when empty. This requires regular attendance or periodic inspection by a nurse or an attendant. A disruption of routine, such as by an emergency, may distract attention, permitting the bottle or bag to become empty.

While a number of techniques have been devised for ascertaining liquid level, most of them are unsuitable for use with infusion apparatus. The fluid administered is, of course, sterile and is procured from a sealed bottle or bag. Therefore, any level detector which must, of necessity, contact the fluid is essentially impractical. Other devices have been proposed to overcome this obstacle but these, for the most part, are expensive, cumbersome, complex or otherwise unsatisfactory. One such device, for example, supports an infusion bottle on a spring and, as the weight of the bottle diminishes, it rises—eventually closing a switch. In addition to the inherent complexity of this device, it will be apparent that a downward pull on the tube supplying the fluid will cause an inaccurate reading.

Accordingly, it is the primary object of this invention, to provide a detector which needs merely to be secured to the outer surface of the bottle or bag, as by a rubber band, and which will accurately detect the point at which the fluid reaches a critical level and actuate the nurses' call system or other alarm. This and other objects will be apparent from the following description and appended claims.

SUMMARY OF THE INVENTION

This invention relates to a device for detecting the level of an electrically conductive material in a nonconductive container. It includes detector means mountable against the external surface of the container including capacitor plate members for forming with the material in the container, a capacitance bridge. Means are included for supplying alternating current power to the bridge and other means, responsive to the balance of the bridge, indicate when the selected level is reached.

BRIEF DESCRIPTION OF THE DRAWINGS

To best understand the construction and operation of this invention, reference may be had to the drawings wherein:

FIG. 1 is a perspective view of a detector in accordance with the invention secured to an infusion bottle;

FIG. 2 is a rear view of the detector of the invention, showing the printed circuit board and portions of the capacitance bridge;

FIG. 3 is a cross section taken substantially along the line 3–3 of FIG. 2;

FIG. 4 is a top view of the detector, partially broken away to illustrate its internal construction;

FIG. 5 is a block diagram of the circuit of the invention;

FIG. 6 is a schematic diagram of the circuit of the invention; and

FIG. 7 is a schematic diagram of a modified form of the circuit of FIG. 6.

DESCRIPTION OF THE PREFERRED EMBODIMENT

With reference to FIG. 1 there is illustrated a hanging infusion bottle B connected in the usual manner by tubing T to a patient. Positioned against the side of the bottle is the detector 10 of this invention, the detector being held against the bottle B by means of a simple rubber band 12. An electrical plug 14 is connected to the detector 10 and makes electrical connections through a power cable 16 to a wall outlet 18 and through a signal cable 20 to a suitable audible alarm 22 or other signalling device.

Referring to FIGS. 3 and 4, the detector 10 will be seen to comprise a boxlike metal housing 24 having substantially rectangular front and sidewalls. The back of the housing is open and its top and bottom walls are curved as illustrated to match the curve of a standard infusion bottle. Mounted inwardly of the housing from its open side is a printed circuit board 26. The circuit board is mounted to the front wall of the housing by means of suitable bolts 28 and is spaced therefrom by spacers 30 so that its central portion lies closely adjacent the bottle wall as shown in FIG. 4. Extensions of bolts 28 support studs 32 which extend outwardly from the face of the housing for engaging the rubber band 12. A four-prong male socket 34 is mounted on the inner surface of the circuit board 26 and is aligned with a suitable opening 36 on the face of the housing to receive the matching plug 14. Two prongs of socket 34 are connected through plug 14 and cable 16 to wall outlet 18, while the remaining two prongs are similarly connected through the signal cable 20 to the alarm 22. One additional feature of the housing is an index line 38 for indicating the fluid level required to actuate the alarm. This index line may be made in any suitable fashion such as by painting.

The back of the printed circuit board 26 is illustrated in FIG. 2 and will be seen to include the usual lines 40 of copper or other conductive material. Other circuit elements such as transistors, diodes, relays, etc. are mounted on the inner side of circuit board 26 and are omitted from FIGS. 3 and 4 for purposes of clarity. The back surface of board 26 will also be seen to carry three closely spaced conductive copper regions. These include an upper region 42 of relatively large area, a lower region 44 of lesser area, and an intermediate region 46 of substantially reduced area. These regions are quite important to the functioning of the apparatus as they form major elements of the capacitance bridge which detects the liquid level. The alarm level is indicated by the line L and will be seen to be approximately the level at which the area of the upper region 42 adjacent the liquid is the same as the area of lower region 44. The manner in which the capacitance bridge is formed and functions will become apparent from the following description of the circuit of the invention.

Referring to the block diagram of FIG. 5, the apparatus of this invention will be seen to comprise a 50 kHz. free running multivibrator oscillator 48 which feeds into the capacitance bridge 50. The output from capacitance bridge 50 is applied to a ring demodulator 52, which is a phase sensitive detector for converting the output from the capacitance bridge into a DC signal which is proportional to the amount by which the surface of the fluid in the bottle or bag is below a reference level. The DC signal from the ring demodulator 52 feeds the amplifier and threshold circuit 54. This circuit generates an output current whenever the fluid level falls below the reference level. The output current energizes a suitable relay 56. The relay contacts may be connected into the nurses' call system, to another signalling device, or into a device which will automatically pinch off the tubing to stop fluid flow when the fluid falls below the reference level.

The schematic diagram of the circuit of the invention is shown in FIG. 6. Referring to the right-hand end of the diagram the power cable 16 from a 110 volt 60 cycle AC source is connected through a rectifying diode 58 and across a smoothing capacitor 60 to a positive bus 62 and a negative bus 64. These supply power to the 50 kHz. oscillator which comprises a pair of NPN transistors 66, 68. The collector of transistor 66 is connected to positive bus 62 through resistor 70 and the collector of transistor 68 is similarly connected to positive bus 62 through resistor 72. The resistor 70 is in series with resistors 74 and 76 across the power supply buses and the base-collector circuit of transistor 66 is connected across resistor 74. The emitters of the transistors are tied together and are connected to the negative bus 64 through a resistor 78.

The base of transistor 68 is connected to that of the transistor 66 through a resistor 80 and to the negative bus 64 through capacitor 82. In addition, the base of transistor 68 is connected to the collector of transistor 66 through a capacitor 84.

The output from the oscillator is supplied to a capacitance bridge shown schematically as comprising four capacitors 86, 88, 90, 92. Capacitor 92 is shown as being variable, the others being fixed. These capacitances are, in fact, formed by the conductive regions 42, 44, 46 on circuit board 26 and by the conductive fluid being monitored. Thus, the intermediate region 46 forms one plate each of capacitors 86, 88. Lower region 44 forms one plate each of capacitors 86, 90 and upper region 42 forms one plate each of capacitors 88, 92. The remaining plates of capacitors 90, 92, which are indicated as being connected to ground, are formed by the fluid being monitored and by the distributed capacitance to ground and to other components. As region 44 is normally always below the fluid level, capacitor 90 is shown as fixed. However, as the fluid level is variable with respect to upper region 42, capacitor 92 is also shown as being variable.

The output from the capacitance bridge is supplied to a ring demodulator comprising four signal diodes 94, 96, 98, 100. The midpoint of the demodulator is referenced by means of two similar resistors 102, 104, whose midpoint is connected to positive bus 62 through resistor 106 and to negative bus 64 through resistor 108.

The DC output from the demodulator is supplied to the bases of NPN transistors 112, 114. Any remaining AC component is short-circuited by filter capacitor 110. The emitters of these transistors are tied together through resistor 116 to negative bus 64. Their collectors are tied through resistors 118, 120, respectively, to positive bus 62. The PNP transistor 122 has its base connected to the collector of transistor 114 and its emitter connected to the collector of transistor 112. Its collector, in turn, is connected to the base of an NPN transistor 124. The collector-emitter circuit of transistor 124 is connected across the power buses through resistor 127. A differential amplifier is formed by NPN transistors 126, 128. Transistor 126 is connected between the power supply buses through resistors 130, 132. The collector-emitter circuit of transistor 128 is connected in parallel with that of transistor 126 through the coil 134 of a relay. The base of transistor 128 is connected at the midpoint of resistors 136, 138 which are connected across the power supply buses. The relay coil 134 operates relay contacts 140 to complete the circuit of signal cable 20.

To understand the operation of this invention, let us first assume that the fluid level is above the alarm level L. Under these circumstances, the capacitance of capacitor 92 is relatively large so that its impedance is low. This acts to shunt the AC voltage to ground so that the AC voltage on plates 42 is relatively smaller than that on plates 44. Under these conditions, the ring demodulator supplies a positive voltage through diode 94 to the base of transistor 112, making it conductive. The negative voltage to the base of transistor 114, renders it nonconductive. As transistor 114 is not conducting, the positive voltage from bus 62 is applied to the base of transistor 122 so it is also nonconductive, as is transistor 124. The positive voltage applied to the base of transistor 126 through resistor 127 causes this transistor to be conductive while transistor 128 remains nonconductive. Thus, there is no circuit established through the relay coil 134 and contacts 140 remain open.

Assuming, now, that the liquid level drops. The capacitance of capacitor 92 decreases and, when alarm level L is reached, the polarity of the ring demodulator output signal becomes zero. As the level drops further, the polarity of the signal reverses. Under these conditions, each transistor assumes the opposite conductive state and the relay coil 134 is energized, closing contacts 140 and signalling the nurse.

Although capacitor 90 has been described as a fixed capacitance it is, in fact, slightly variable as it adjusts the capacitance bridge for variations in the wall thickness of the infusion bottle or bag. In other words, regions 44 and 42 are equally distant from the fluid being monitored so that any variation in wall thickness, as between a bottle and a bag, affects capacitors 90, 92 equally.

It is believed that the construction and operation of this invention will now be apparent to those skilled in the art. In an actual embodiment of the circuit of FIG. 6 the following circuit components were employed:

Resistors 102, 104, 106, 127, 136    100 K ohms;
Resistors 118, 120    2.2 M ohms;
Resistor 116    220 K ohms;
Resistors 70, 72, 108, 130, 138    22 K ohms;
Resistors 78, 80, 132    4.7 K ohms;
Resistor 74    2.2 K ohms;
Capacitors 84, 82, 110    0.0015 mf
Diodes 94, 96, 98, 100    1N914
Diode 58    1N4818

In the circuit of FIG. 7 there is illustrated a modification of the circuit of FIG. 6. Essentially, the only difference is that the amplifier transistors are replaced by unipolar transistors 141, 142. As the demodulator is a high impedance, low current device, these transistors have been found to give better results, in some circumstances, than standard transistors. Otherwise, the circuit is essentially similar and similar reference numerals are employed with a prime attached.

It is believed that the many advantages of this invention will now be apparent to those skilled in the art. It will also be apparent that a number of variations and modifications may be made therein without departing from its spirit and scope. For example, although the foregoing description has illustrated a low level detector, the device could also be incorporated in a high level detector. Furthermore, the circuit may be easily modified to provide a proportional output, rather than a simple on —off indication. Other variations and modifications will readily suggest themselves to those skilled in the art. Accordingly, the foregoing description is to be construed as illustrative only rather than limiting.

I claim:

1. A device for detecting the level of an electrically conductive material in a nonconductive container which comprises: detector means mountable against the external surface of said container and including capacitor plate members which form, with said material, a capacitance bridge; means for supplying alternating current power to said bridge; and means responsive to the balance of said bridge to indicate a selected level condition of said material.

2. The device of claim 1 wherein said detector means comprises a printed circuit board having conductive regions thereon forming said capacitor plate members.

3. The device of claim 1 wherein said supplying means comprises an oscillator.

4. The device of claim 1 wherein said responsive means comprises demodulator means connected to the output from said bridge for producing a DC signal responsive to the bridge balance.

5. The device of claim 4 wherein the polarity of said DC signal becomes zero when the level of the material reaches said selected level, and reverses as the level of the material crosses said selected level.

6. The device of claim 4 wherein said responsive means further comprises means for amplifying said DC signal.

7. The device of claim 6 wherein said responsive means further comprises an alarm actuated by said amplified DC signal.

8. The device of claim 2 wherein said conductive regions comprise a first region normally below the material level, a second region extending above and below the selected level, and a third region intermediate said first and second regions.

9. The device of claim 1 wherein: said detector means comprises a printed circuit board having conductive regions thereon forming said capacitor plate members; and said responsive means comprises demodulator means connected to the output of said bridge for producing a DC signal responsive to the bridge balance and an alarm actuated by said DC signal at said selected level condition.

10. The device of claim 9 wherein said conductive regions comprise a first region normally below the material level, a second region extending above and below the selected level, and a third region intermediate said first and second regions.